(12) United States Patent
Wang et al.

(10) Patent No.: US 8,670,484 B2
(45) Date of Patent: Mar. 11, 2014

(54) METHOD AND APPARATUS FOR SELECTING A CODING MODE

(75) Inventors: Limin Wang, San Diego, CA (US); Jian Zhou, Fremont, CA (US)

(73) Assignee: General Instrument Corporation, Horsham, PA (US)

( * ) Notice: Subject to any disclaimer, the term of this patent is extended or adjusted under 35 U.S.C. 154(b) by 1585 days.

(21) Appl. No.: 11/957,750

(22) Filed: Dec. 17, 2007

(65) Prior Publication Data

US 2009/0154555 A1    Jun. 18, 2009

(51) Int. Cl.
  *H04N 7/12* (2006.01)
(52) U.S. Cl.
  USPC .................................................. 375/240.24
(58) Field of Classification Search
  USPC .................................................. 375/240.02
  See application file for complete search history.

(56) References Cited

U.S. PATENT DOCUMENTS

| | | | | |
|---|---|---|---|---|
| 5,737,020 A | * | 4/1998 | Hall et al. | 375/240.2 |
| 5,742,346 A | * | 4/1998 | Sievers et al. | 375/240.24 |
| 5,878,166 A | | 3/1999 | Legall | |
| 2004/0120397 A1 | * | 6/2004 | Zhang et al. | 375/240.03 |
| 2006/0198439 A1 | | 9/2006 | Zhu | |

OTHER PUBLICATIONS

PCT International Search Report, RE: PCT Application #PCT/US08/86340 Dec. 11, 2008.
Extended European Search Report, RE: Application #08863281.5-1907/2235940, PCTUS2008086340, Mar. 28, 2013.
Kutka R Ed, et al, "Block Adaptive Frame/Field DCT Coding Decided by the Vertical Difference Test", Signal Processing of HDTV, 2. Turin, Aug. 30-Sep. 1, 1989. [Proceedings of the International Workshop on HDTV], Amsterdam, Elsevier, NL, vol. Workshop 3. Aug. 30, 1989. pp. 739-748.
Guerrero M A, et al., "Fast Macroblock-Adaptive Frame/Field Coding Selection in H.264", Internet Citation, Mar. 8, 2005.
Office Action, Canadian App. No. 2,706,711, Jun. 6, 2012.

* cited by examiner

*Primary Examiner* — Mark Rinehart
*Assistant Examiner* — Maharishi Khirodhar
(74) *Attorney, Agent, or Firm* — Lori Anne D. Swanson (57) ABSTRACT

A method and apparatus for selecting a coding mode are described. For example, the method receives at least one block of a signal to be encoded. The method determines a frame vertical pixel difference in the at least one block and determines a field vertical pixel difference in the at least one block. The method then compares the frame vertical pixel difference with the field vertical pixel difference to determine a first coding mode for the at least one block.

17 Claims, 4 Drawing Sheets

METHOD AND APPARATUS FOR SELECTING A CODING MODE

BACKGROUND OF THE INVENTION

1. Field of the Invention

The present invention relates to video encoders and, more particularly, to a method and apparatus for selecting a coding mode (e.g., a frame coding mode or a field coding mode).

2. Description of the Background Art

The International Telecommunication Union (ITU) H.264 video coding standard is able to compress video much more efficiently than earlier video coding standards, such as ITU H.263, MPEG-2 (Moving Picture Experts Group), and MPEG-4. H.264 is also known as MPEG-4 Part 10 and Advanced Video Coding (AVC). H.264 exhibits a combination of new techniques and increased degrees of freedom in using existing techniques. Among the new techniques defined in H.264 are 4×4 and 8×8 integer transform (e.g., DCT-like integer transform), multi-frame prediction, context adaptive variable length coding (CAVLC), SI/SP frames, context-adaptive binary arithmetic coding (CABAC), and adaptive frame/field coding. The increased degrees of freedom come about by allowing multiple reference frames for prediction and many more tessellations of a 16×16 pixel macroblock (MB). These new tools and methods add to the coding efficiency at the cost of increased encoding and decoding complexity in terms of logic, memory, and number of operations. This complexity far surpasses those of H.263 and MPEG-4 and begs the need for efficient implementations.

The H.264 standard belongs to the hybrid motion-compensated DCT (MC-DCT) family of codecs. H.264 is able to generate an efficient representation of the source video by reducing temporal and spatial redundancies. Temporal redundancies are removed by a combination of motion estimation (ME) and motion compensation (MC). ME is the process of estimating the motion of a current frame in the source video from previously coded frame(s). This motion information is used to motion compensate the previously coded frame(s) to form a prediction for the current frame. The prediction is then subtracted from the original current frame to form a displaced frame difference (DFD). The motion information is present for each block of pixel data. In H.264, there are seven possible block sizes within a macroblock, e.g., 16×16, 16×8, 8×16, 8×8, 8×4, 4×8, and 4×4 (also referred to as tessellations or partitions). Thus, a 16×16 pixel macroblock (MB) can be tessellated into the following partitions: (A) one 16×16 macroblock region; (B) two 16×8 tessellations; (C) two 8×16 tessellations; and (D) four 8×8 tessellations. Furthermore, each of the 8×8 tessellations can be decomposed into: (a) one 8×8 region; (b) two 8×4 regions; (c) two 4×8 regions; and (d) four 4×4 regions.

Furthermore, the motion vector for each block is unique and can point to different reference frames. The job of the encoder is to find the optimal way of breaking down a 16×16 macroblock into smaller blocks (along with the corresponding motion vectors) in order to maximize compression efficiency. This breaking down of the macroblock into a specific pattern is commonly referred to as "mode selection" or "mode decision."

In addition, the H.264 standard allows for the adaptive switching between frame coding and field coding modes. Notably, this type of switching can occur at both the picture and the macroblock (MB) pair levels. However, present day processes are typically exhaustive in the sense that H.264 encoders encode a picture by completely executing both frame coding and field coding techniques and subsequently comparing the two end products to see which one performed better. Namely, each picture is encoded in its entirety twice. This approach is computationally expensive.

Accordingly, there exists a need in the art for a method and apparatus for an improved adaptive frame/field mode selection encoding method.

SUMMARY OF THE INVENTION

In one embodiment, a method and apparatus for selecting a coding mode are described. For example, the method receives at least one block of a signal to be encoded. The method determines a frame vertical pixel difference in the at least one block and determines a field vertical pixel difference in the at least one block. The method then compares the frame vertical pixel difference with the field vertical pixel difference to determine a first coding mode for the at least one block.

In an alternate embodiment, a method and apparatus for selecting a coding mode are described. For example, the method receives at least one block of a signal to be encoded. The method then determines a field coding cost of the at least one block in accordance with a field coding mode and determines a frame coding cost of the at least one block in accordance with a frame coding mode. The method then compares the frame coding cost with the field coding cost to determine a coding mode for the at least one block.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Method and apparatus for mode selection in a video encoder is described. One or more aspects of the invention relate to predictive frame (i.e., INTER) mode selection in an H.264 video encoder or H.264-like encoder. Although the present invention is disclosed in the context of an H.264-like encoder, the present invention is not so limited. Namely, the present invention can be adapted to other motion compensation (MC) encoding standards. The INTER mode selection is independent of the motion estimation algorithm. In one embodiment, the INTER mode selection is a one-pass decision algorithm aiming to approximate the multi-pass R-D optimization based on encoder parameters and statistical data. The algorithm uses a bits model in which some of the components are measured exactly, and the residual block bits are estimated through a statistical model. The statistical model can be adapted based on the actual encoded bits.

Embodiments of the invention use the following definitions:

| | |
|---|---|
| R | Rate (bit-rate) of the encoder |
| D | Coding distortion of the encoder |
| SAD | Sum of absolute differences between a block and its corresponding reference block or any similar metric |
| QP | Quantization parameter |
| MV | Motion vector for a macroblock or block |
| MB_TYPE | Partitioning of macroblock: one of 16x16, 16x8, 8x16, and 8x8 |
| SUB_MB_TYPE | Partitioning of 8x8 block: one of 8x8, 8x4, 4x8, and 4x4 |
| MODE | INTER macroblock partitioning. This is the set of values of MB_TYPE and SUB_MB_TYPE |

Figure 1:
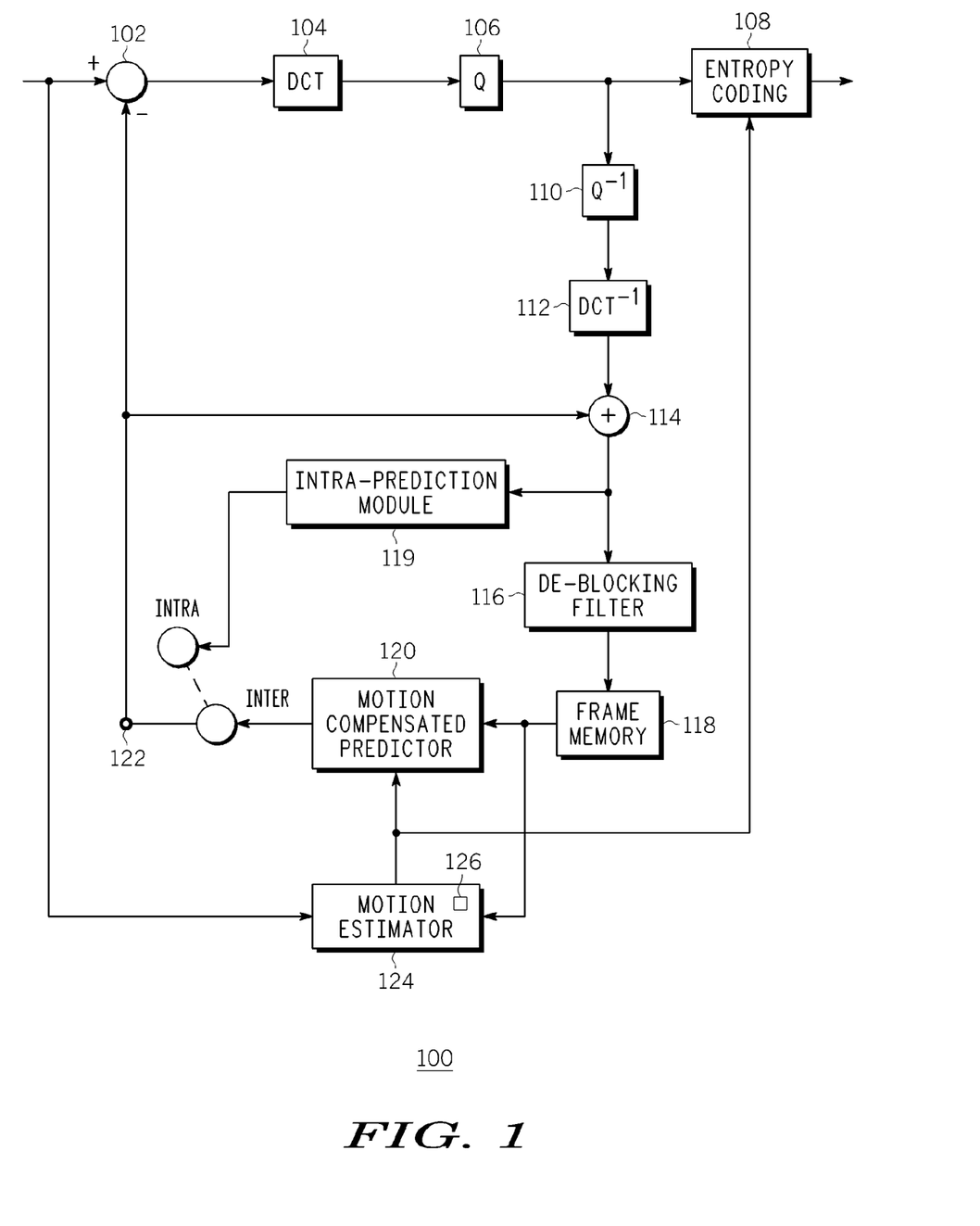
FIG. 1 is a block diagram depicting an exemplary embodiment of a video encoder.

FIG. 1 is a block diagram depicting an exemplary embodiment of a video encoder 100. In one embodiment, the video encoder is compliant with the H.264 standard. The video encoder 100 includes a subtractor 102, a discrete cosine transform (DCT) module 104, a quantizer 106, an entropy coder 108, an inverse quantizer 110, an inverse DCT module 112, an adder 114, a deblocking filter 116, a frame memory 118, a motion compensated predictor 120, an intra/inter switch 122, and a motion estimator 124. The video encoder 100 receives a sequence of source frames. The subtractor 102 receives a source frame from the input sequence and a predicted frame from the intra/inter switch 122. The subtractor 102 computes a difference between the source frame and the predicted frame, which is provided to the DCT module 104. In INTER mode, the predicted frame is generated by the motion compensated predictor 120. In INTRA mode, a predicted MB is formed by the pixels from the neighboring MBs in the same frame.

The DCT module 104 transforms the difference signal from the pixel domain to the frequency domain using a DCT-like algorithm to produce a set of coefficients. The quantizer 106 quantizes the DCT coefficients. The entropy coder 108 codes the quantized DCT coefficients to produce a coded frame.

The inverse quantizer 110 performs the inverse operation of the quantizer 106 to recover the DCT coefficients. The inverse DCT module 112 performs the inverse operation of the DCT-like module 104 to produce a reconstructed difference signal. The reconstructed difference signal is added to the predicted frame by the adder 114 to produce a reconstructed frame, which is coupled to the deblocking filter 116. The deblocking filter smoothes the reconstructed frame and stores the reconstructed frame in the frame memory 118. The motion compensated predictor 120 and the motion estimator 124 are coupled to the frame memory 118 and are configured to obtain one or more previously reconstructed frames (previously coded frames).

The motion estimator 124 also receives the source frame. The motion estimator 124 performs a motion estimation algorithm using the source frames and previous reconstructed frames (i.e., reference frames) to produce motion estimation data. The motion estimation data includes motion vectors and associated references. The motion estimation data is provided to the entropy coder 108 and the motion compensated predictor 120. The entropy coder 108 codes the motion estimation data to produce coded motion data. The motion compensated predictor 120 performs a motion compensation algorithm using a previous reconstructed frame and the motion estimation data to produce the predicted frame, which is coupled to the intra/inter switch 122. Motion estimation and motion compensation algorithms are well known in the art. In one embodiment, the motion estimator 124 includes mode decision logic 126. The mode decision logic 126 is configured to select a mode for each macroblock, or pair of macroblocks, in a predictive (INTER) frame. The "mode" of a macroblock is the partitioning scheme. That is, in one embodiment, the mode decision logic 126 selects MODE for each macroblock in a predictive frame.

The present invention sets forth at least one solution for selecting either a frame coding mode or a field coding mode on both a per picture basis or a per macroblock (MB) pair basis. In one embodiment, one solution may include two separate yet related methods. Notably, the first method utilizes frame and field vertical pixel difference comparisons, while the second method entails the use of a coding cost procedure.

The reasoning for using the frame and field vertical pixel difference comparison method is two-fold. First, for stationary areas of a picture comprising two fields, the difference between the consecutive pixels of the picture in the vertical direction tends to be smaller than the difference between the consecutive pixels of each of two fields of the picture in the vertical direction. Secondly, for moving areas of a picture comprising two fields, the difference between the consecutive pixels of the picture in the vertical direction tends to be larger than the difference between the consecutive pixels of each of two fields of the picture in the vertical direction.

Similarly, the coding costs (e.g., the motion estimation costs) of a MB pair in frame and field modes may also be used to determine whether a frame or a field coding mode is more suitable for a particular MB pair. In one embodiment, the coding cost (J) is defined as:

$$J = SAD + \lambda \times f(MV, refldx, mbType) \qquad \text{Eq. 1}$$

where SAD is a difference measurement between the pixels and their (temporal or spatial) predictions for every MB or sub-MB partition. Namely, pixel predictions come from either a temporal prediction or a spatial prediction. In one embodiment, SAD may also represent the distortion present in an MB pair. Similarly, the MV variable represents motion vectors, refldx is the reference picture index, and mbType is the type of macroblocks or MB partitions. An MB partition may include any sub-macroblock configuration derived from a 16×16 MB, such as a 4×4 block, an 8×8 block, or the like. The function portion of the equation, which attempts to serve as a representation of the number of coding bits, varies in accordance with the type of coding process that is conducted. For example, if the coding cost for intra prediction coding is needed, then the function does not consider the motion vectors or the refld variables. The variable $\lambda$ represents a constant depending upon the quantization parameter and other coding parameters. In one embodiment, the variable $\lambda$ may be utilized to nullify the units resulting from the function portion of the equation so that J results in a unitless value. The coding cost can be measured in either frame or field mode. As demonstrated below, a frame/field mode selection of an MB pair or picture can be based upon the frame and field coding costs.

Figure 2:
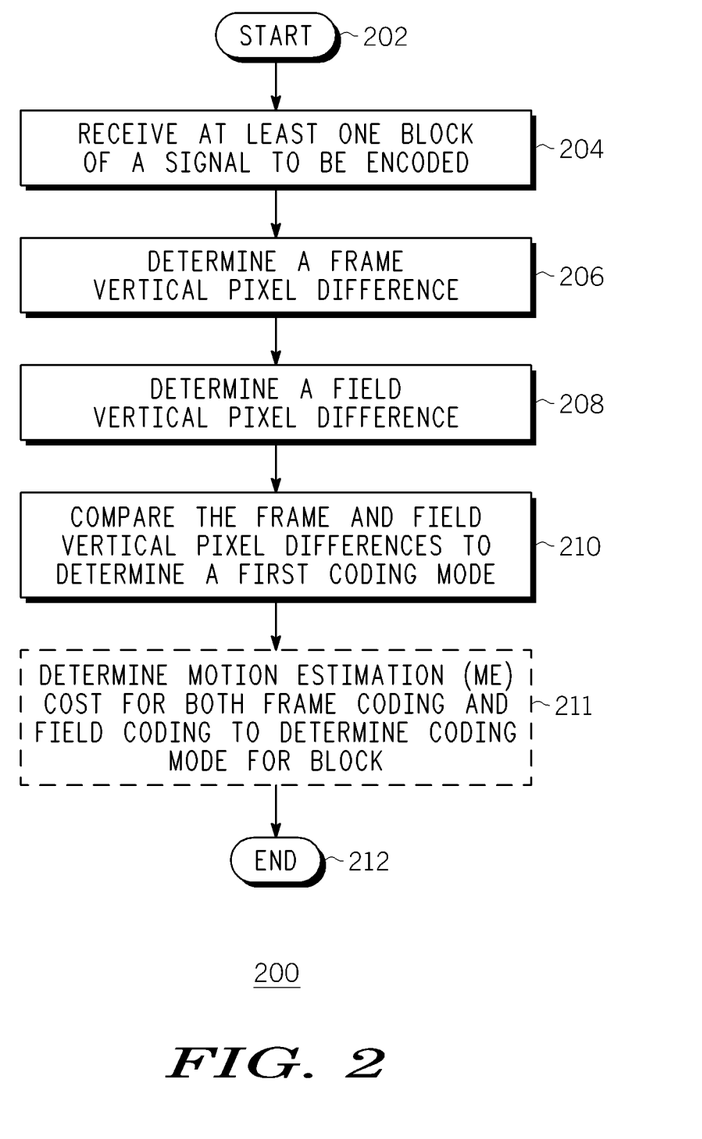
FIG. 2 is a flow diagram depicting an exemplary embodiment of a method for a selecting a coding mode in accordance with one or more aspects of the invention.

FIG. 2 is a flow diagram that depicts an exemplary embodiment of the present invention. Namely, method 200 describes the steps in which a coding mode is determined by one embodiment of the present invention. The method 200 begins at step 202 and proceeds to step 204 where at least one block (e.g., a macroblock or a macroblock pair) of a signal to be encoded is received.

At step 206, a frame vertical pixel difference in the at least one block is determined.

At step 208, a field vertical pixel difference in the at least one block is determined.

At step 210, the frame vertical pixel difference is compared with the field vertical pixel difference to determine a first coding mode for the at least one block.

At step 211, method 200 performs the optional step of computing the motion estimation (ME) cost for both the frame coding mode and the filed coding mode, where the two ME costs are then compared to further assist in the determining of a proper coding mode for the at least one block. A detailed description of this step is further described below. The method 200 ends at step 212.

It should be noted that although FIG. 2 illustrates the implementation of the motion estimation (ME) cost computation as being performed after the vertical pixel difference computation, this is only illustrative. In other words, the motion estimation (ME) cost computation and the vertical pixel difference computation can be implemented in combination or separately. As such, the motion estimation (ME) cost computation and the vertical pixel difference computation can be performed in parallel or in any sequential order as required for a particular implementation. Thus, an implementation of the present invention may implement the motion estimation (ME) cost computation without the vertical pixel difference computation or vice versa.

Figure 3:
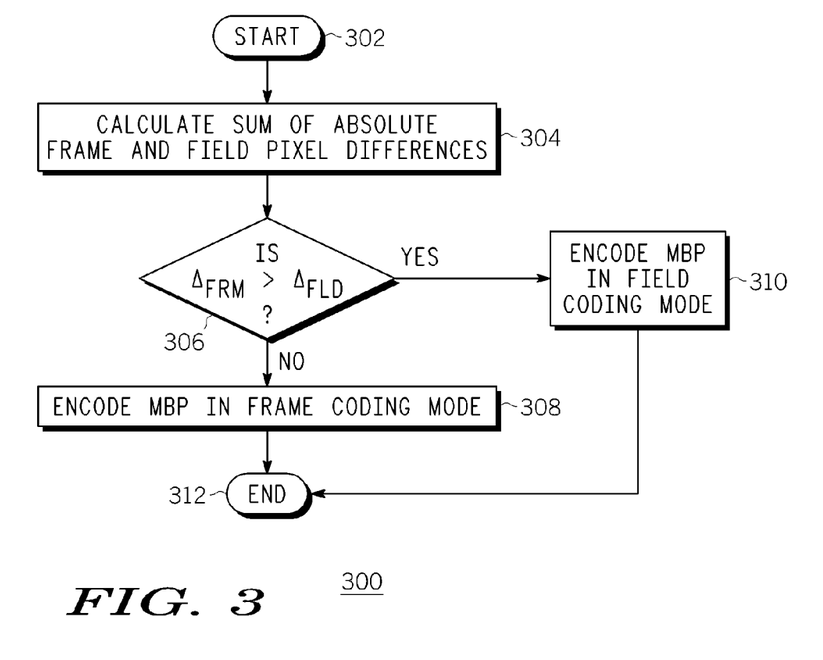
FIG. 3 is a flow diagram depicting an exemplary embodiment of a method for a frame and field mode selection process in accordance with one or more aspects of the invention.

FIG. 3 is a flow diagram depicting an exemplary embodiment of a method 300 for utilizing a frame and field vertical pixel comparison in accordance with one or more aspects of the invention. Although the following method specifically describes the processing of a block on an MB pair level, the method 300 can be similarly applied to processing of a picture on a picture level.

The method 300 begins at step 302 and proceeds to step 304 where the sum of the differences between the absolute frame and field pixels differences in the vertical direction is calculated. In one embodiment, the vertical frame pixel difference is determined to be:

$$\Delta_{FRM} = \sum_j \text{abs}|X_{i,j} - X_{i,j+1}| \quad \text{Eq. 2}$$

where i and j are the pixel horizontal and vertical indices, and (i, j) are over the MB pair. This formula essentially involves the determination of the difference between two lines in the same frame picture (i.e. $X_{i,j}$ represents a first line and $X_{i,j+1}$ represents the next line of the same MB). Similarly, in one embodiment, the vertical field pixel difference is determined to be:

$$\Delta_{FLD} = \sum_j \text{abs}|X_{i,2j} - X_{i,2(j+1)}| + \sum_j \text{abs}|X_{i,2j+1} - X_{i,2(j+1)+1}| \quad \text{Eq. 3}$$

This formula pertains to the sum of differences between lines within each field of a MB. More specifically, the first component of the equation deals with the difference between two lines in a first field in a MB (e.g., a top field of a MB) and the second component of the equation deals with the difference between two lines in a second field of the same MB (e.g., the bottom field of same MB).

At step 306, the frame and field pixel differences in the vertical direction are compared. Namely, in one embodiment, if the frame pixel difference is greater than the field pixel difference (i.e., $\Delta_{FRM} > \Delta_{FLD}$), then the method 300 continues to step 310. At step 310, field coding mode is selected for the MB pair. Conversely, if the frame pixel difference is not greater than the field pixel difference, then the method 300 continues to step 308. At step 308, frame coding mode is selected for the MB pair. The method 300 ends at step 312.

Figure 4:
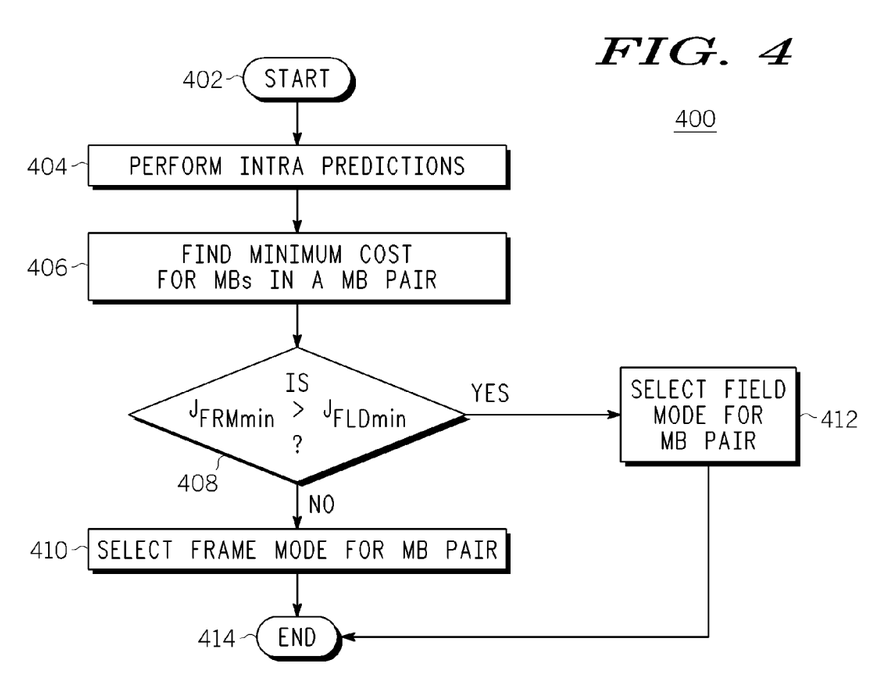
FIG. 4 is a flow diagram depicting an exemplary embodiment of a method for a frame and field mode selection process for an I-picture in accordance with one or more aspects of the invention.

The present invention also employs an optional procedure for utilizing a coding cost to determine the use of frame or field mode for an I-picture. An exemplary method 400 depicts one embodiment of such a process for an I-picture. Namely, FIG. 4 is a flow diagram depicting a method 400 for determining a coding mode in accordance with one or more aspects of the invention.

The method 400 begins at step 402 and proceeds to step 404 where at least one intra frame prediction is performed. In one embodiment, an intra frame prediction is performed for all of the possible prediction directions for an intra 4×4 sub-MB partition, an intra 8×8 sub-MB partition, and an intra 16×16 macroblock for each MB of a given MB pair. For example, both the intra 4×4 MB and the 8×8 MB have nine directions to be considered. Similarly, the 16×16 MB has four directions to be considered. Because this step is conducted in both the frame and field coding modes for both the top and bottom MB of the MB pair, a total of 736 direction calculations (i.e., (9 directions for 16 of 4×4 block+9 directions for 4 of 8×8 block+4 directions for one of 16×16 block)*2 MBs in a MB pair*2 coding modes=736), may take place per MB pair in at least one embodiment.

At step 406, in one embodiment, a minimum cost for each MB of a MB pair is determined. In one embodiment, the minimum costs of each MB in the MB pair are added together for both the frame mode and the field mode. More specifically, each of the directions calculated in step 404 (along with the respective block type information) is applied to the coding cost formula (see Eq. 1). Since method 400 pertains to I-pictures only, the coding cost formula does not consider temporal predictions or motion estimation. Afterwards, a minimum cost is selected for each MB of the MB pair. For example, a first minimum cost (regardless of the block type used to determine that minimum cost) is selected for the top MB and a second minimum cost (regardless of the block type used to determine that minimum cost) is selected for the bottom MB of the MB pair. A final minimum cost is then calculated by summing the minimum cost for the top MB to the minimum cost of the bottom MB. Notably, this calculation is conducted for both the frame coding mode and the field coding mode so that two separate final minimum costs, i.e., the minimum field cost ($J_{FLDmin}$) and the minimum frame cost ($J_{FRMmin}$), are respectively determined.

At step 408, the calculated $J_{FLDmin}$ and the $J_{FRMmin}$ are compared. If $J_{FRMmin}$ is not found to be greater than $J_{FLDmin}$, then the method 400 proceeds to step 410 where the frame coding mode is selected for the MB pair. Alternatively, if $J_{FRMmin}$ is found to be greater than $J_{FLDmin}$, then the method 400 proceeds to step 412 where the field coding mode is selected for the MB pair. The method 400 ends at step 414.

In an alternative embodiment, the method 400 may also be used to determine a minimum coding cost on the picture level (as opposed to MB pair level). Notably, the alternative method is identical to method 400 with the exception that after step 406, all of the minimum frame coding costs and the minimum field coding costs per MB pair are summed over the entire picture in a separate manner. For example, $$J_{sum\_FRMmin} = \sum_{i,j} J_{FRMmin}(i, j) \text{ and } J_{sum\_FLDmin} \quad \text{Eq. 4}$$
$$= \sum_{i,j} J_{FLDmin}(i, j)$$

Similarly, step 408 of method 400 would be replaced with the comparison of $J_{sum\_FRMmin}$ and $J_{sum\_FLDmin}$. Consequently, if $J_{sum\_FRMmin}$ is found to be greater than $J_{sum\_FLDmin}$, then the field coding mode is selected for the picture. Alternatively, if $J_{sum\_FRMmin}$ is not found to be greater than $J_{sum\_FLDmin}$, then the frame coding mode is selected for the picture.

Figure 5:
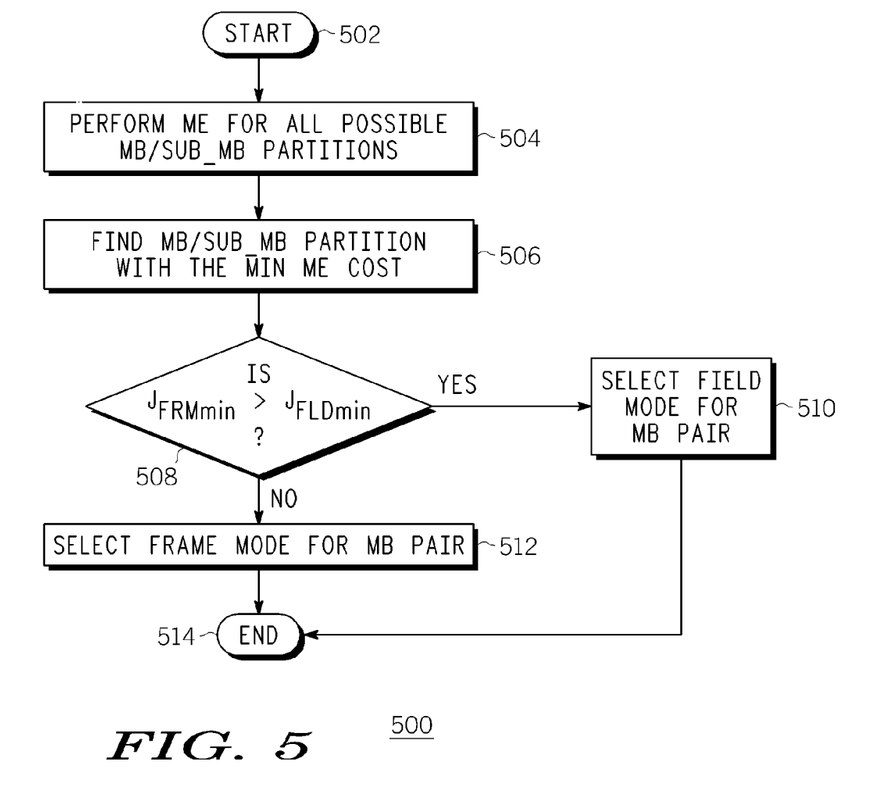
FIG. 5 is a flow diagram depicting an exemplary embodiment of a method for a frame and field mode selection process for a P- and B-picture in accordance with one or more aspects of the invention.

The present invention also employs a procedure for utilizing a coding cost to determine the use of frame or field mode for P-pictures or B-pictures. An exemplary method 500 depicts one embodiment of such a process. Namely, FIG. 5 is a flow diagram depicting a method 500 for determining a coding mode in accordance with one or more aspects of the invention.

In one embodiment, the method 500 begins at step 502 and proceeds to step 504 where motion estimations (MEs) are performed for all possible MBs or sub-MB partitions for each of the MB of a MB pair for both frame mode and field mode. In one embodiment, an inter frame prediction is performed for all of the possible prediction directions for a 4×4 sub-MB partition, a 4×8 sub-MB partition, an 8×4 sub-MB partition, an 8×8 sub-MB partition, an 8×16 sub-MB partition, a 16×8 sub-MB partition, and a 16×16 macroblock for each of the two MBs of a MB pair.

At step 506, the MB/sub-MB partition type with the minimum coding cost is found for each MB of a MB pair in both the frame coding mode and the field coding mode. In one embodiment, the present invention calculates a motion estimation cost using the cost coding formula (i.e., Eq. 1). Notably, the formula is applied to each of the seven different types of MB/sub-MB partitions twice, once in the frame mode and then in the field mode, so that a minimum ME cost for both frame coding and field coding is calculated for each MB/sub-MB partition.

Afterwards, a minimum ME cost is selected for each MB of the MB pair. For example, a first minimum cost (regardless of the block type used to determine that minimum cost) is selected for the top MB and a second minimum ME cost (regardless of the block type used to determine that minimum cost) is selected for the bottom MB of the MB pair. A final minimum ME cost is then calculated by summing the minimum cost for the top MB to the minimum cost of the bottom MB. Notably, this calculation is conducted for both the frame coding mode and the field coding mode so that two separate final minimum costs, i.e., the minimum field cost ($J_{FLDmin}$) and the minimum frame cost ($J_{FRMmin}$), are respectively determined.

At step 508, the calculated $J_{FLDmin}$ and the $J_{FRMmin}$ are compared. If $J_{FRMmin}$ is found to be greater than $J_{FLDmin}$, then the method 500 proceeds to step 510 where the field mode is selected for the MB pair. Alternatively, if $J_{FRMmin}$ is not found to be greater than $J_{FLDmin}$, then the method 500 proceeds to step 512 where the frame mode is selected for the MB pair. The method 500 ends at step 514.

In an alternative embodiment, the method 500 may also be used to determining a minimum coding cost for a P-picture or B-picture on the picture level (as opposed to MB pair level). Notably, the alternative method is identical to method 500 with the exception that after step 506, all of the minimum frame coding costs and minimum field coding costs are summed over the entire picture in a separate manner. For example, $$J_{sum\_FRMmin} = \sum_{i,j} J_{FRMmin}(i, j) \text{ and } J_{sum\_FLDmin} \quad \text{Eq. 5}$$
$$= \sum_{i,j} J_{FLDmin}(i, j)$$

Similarly, step 508 of method 500 would be replaced with the comparison of $J_{sum\_FRMmin}$ and $J_{sum\_FLDmin}$. Specifically, if $J_{sum\_FRMmin}$ is found to be greater than $J_{sum\_FLDmin}$, then the field coding mode is selected for the picture. Alternatively, if $J_{sum\_FRMmin}$ is not found to be greater than $J_{sum\_FLDmin}$, then the frame coding mode is selected for the picture.

In one embodiment, on the MB pair level, the present invention determines if the outcomes of the frame/field mode selection process based on vertical pixel difference (e.g., method 300) and the coding cost process (e.g., method 400 for I pictures and method 500 for P and B pictures) are the same. If the results are indeed the same, then the result is considered final. If the results are different or there is some type of discrepancy, then additional criteria or calculations may be required. For instance, the following formula could be used to determine whether frame or field coding should be implemented:

$$\frac{|J_{FRMmin} - J_{FLDmin}|}{J_{FRMmin} + J_{FLDmin}} > \alpha \frac{|\Delta_{FRM} - \Delta_{FLD}|}{\Delta_{FRM} + \Delta_{FLD}} \quad \text{Eq. 6}$$

where $\alpha$ is a constant ranging from 0 to 1.0. If the above formula holds true, then the result from the coding cost formula should be used. Otherwise, the result from the frame/field vertical pixel difference comparison should be used.

In an alternative embodiment, the present invention determines if the outcomes of the frame/field mode selection process and the coding cost process, as processed on the picture level, are the same. If the results are indeed are the same, then the result is considered final. If the results are different or there is some type of discrepancy, then additional criteria may be required. For example, the final decision on the frame and field mode per picture may be determined using Table 1 below. The final decision is based on the decision from the above comparisons of the aforementioned alternative embodiments.

TABLE 1

| Decision of Approach 1 | Decision of Approach 2 | Final Decision |
| --- | --- | --- |
| Frame | Frame | Frame |
| Frame | Field | Frame |
| Field | Frame | Frame |
| Field | Field | Field |

In this particular embodiment, Table 1 is biased towards a frame coding mode because in a frame picture, MBAFF can be turned on, which may further compensate an incorrect decision made at the picture level (if any).

Figure 6:
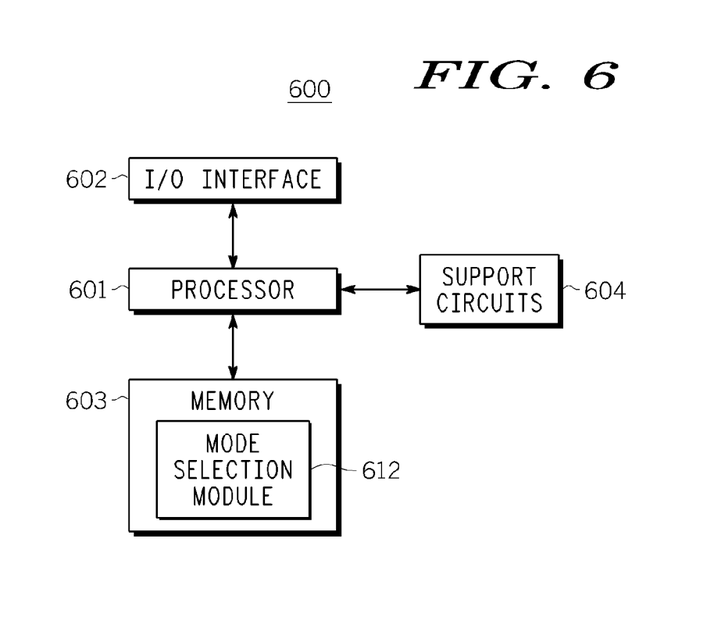
FIG. 6 is a block diagram depicting an exemplary embodiment of a general computer suitable for implementing the processes and methods described herein.

FIG. 6 is a block diagram depicting an exemplary embodiment of a video encoder 600 in accordance with one or more aspects of the invention. The video encoder 600 includes a processor 601, a memory 603, various support circuits 604, and an I/O interface 602. The processor 601 may be any type of processing element known in the art, such as a microcontroller, digital signal processor (DSP), instruction-set processor, dedicated processing logic, or the like. The support circuits 604 for the processor 601 include conventional clock circuits, data registers, I/O interfaces, and the like. The I/O interface 602 may be directly coupled to the memory 603 or coupled through the processor 601. The I/O interface 602 may be coupled to a frame buffer and a motion compensator, as well as to receive input frames. The memory 603 may include one or more of the following random access memory, read only memory, magneto-resistive read/write memory, optical read/write memory, cache memory, magnetic read/write memory, and the like, as well as signal-bearing media as described below.

In one embodiment, the memory 603 stores processor-executable instructions and/or data that may be executed by and/or used by the processor 601 as described further below. These processor-executable instructions may comprise hardware, firmware, software, and the like, or some combination thereof. Modules having processor-executable instructions that are stored in the memory 603 may include a mode selection module 612. For example, the mode selection module 612 is configured to perform the methods 200, 300, 400, and 500 of FIGS. 2, 3, 4, and 5 respectively. Although one or more aspects of the invention are disclosed as being implemented as a processor executing a software program, those skilled in the art will appreciate that the invention may be implemented in hardware, software, or a combination of hardware and software. Such implementations may include a number of processors independently executing various programs and dedicated hardware, such as ASICs.

An aspect of the invention is implemented as a program product for execution by a processor. Program(s) of the program product defines functions of embodiments and can be contained on a variety of signal-bearing media (computer readable media), which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to illustrative embodiments of the present invention, other and further embodiments of the invention may be devised without departing from the basic scope thereof, and the scope thereof is determined by the claims that follow.

What is claimed is:

1. A method for selecting a coding mode, comprising:
   receiving at least one block of a signal to be encoded;
   determining a frame vertical pixel difference in said at least one block;
   determining a field vertical pixel difference in said at least one block;
   determining a field coding cost of motion estimation of said at least one block in accordance with a field coding mode;
   determining a frame coding cost of motion estimation of said at least one block in accordance with a frame coding mode;
   comparing said frame vertical pixel difference with said field vertical pixel difference to determine a first coding mode for said at least one block
   comparing said frame coding cost with said field coding cost to determine a second coding mode for said at least one block; and
   responsive to the first coding mode being the same as the second coding mode, selecting the coding mode as the first coding mode.

2. The method of claim 1, wherein said first coding mode comprises a field coding mode for said at least one block if said frame vertical pixel difference is greater than said field vertical pixel difference.

3. The method of claim 1, wherein said first coding mode comprises a frame coding mode for said at least one block if said frame vertical pixel difference is less than or equal to said field vertical pixel difference.

4. The method of claim 1, wherein said at least one block comprises a macroblock pair.

5. The method of claim 1, wherein said at least one block comprises a partition comprising at least one of: a 16×16 block, a 16×8 block, an 8×16 block, an 8×8 block, an 8×4 block, a 4×8 block, or a 4×4 block.

6. The method of claim 1, wherein said at least one block comprises a picture.

7. The method of claim 1, wherein an additional criterion is utilized to determine said coding mode for said at least one block if said first coding mode differs from said second coding mode.

8. A computer readable Device having stored thereon instructions that, when executed by a processor, causes the processor to perform a method for selecting a coding mode, comprising:
   receiving at least one block of a signal to be encoded;
   determining a frame vertical pixel difference in said at least one block;
   determining a field vertical pixel difference in said at least one block;
   determining a field coding cost of motion estimation of said at least one block in accordance with a field coding mode;
   determining a frame coding cost of motion estimation of said at least one block in accordance with a frame coding mode;
   comparing said frame vertical pixel difference with said field vertical pixel difference to determine a first coding mode for said at least one block;
   comparing said frame coding cost with said field coding cost to determine a second coding mode for said at least one block; and
   responsive to the first coding mode being the same as the second coding mode, selecting the coding mode as the first coding mode.

9. The computer readable medium of claim 8, wherein said first coding mode comprises a field coding mode for said at least one block if said frame vertical pixel difference is greater than said field vertical pixel difference.

10. The computer readable medium of claim 8, wherein said first coding mode comprises a frame coding mode for said at least one block if said frame vertical pixel difference is less than or equal to said field vertical pixel difference.

11. The computer readable medium of claim 8, wherein said at least one block comprises a macroblock pair.

12. The computer readable medium of claim 8, wherein said at least one block comprises a partition comprising at least one of: a 16×16 block, a 16×8 block, an 8×16 block, an 8×8 block, an 8×4 block, a 4×8 block, or a 4×4 block.

13. The computer readable medium of claim 8, wherein said at least one block comprises a picture.

14. The computer readable medium of claim 8, wherein an additional criterion is utilized to determine said coding mode for said at least one block if said first coding mode differs from said second coding mode.

15. An apparatus for selecting a coding mode, comprising:
 means for receiving at least one block of a signal to be encoded;
 means for determining a frame vertical pixel difference in said at least one block;
 means for determining a field vertical pixel difference in said at least one block;
 means for determining a field coding cost of motion estimation of said at least one block in accordance with a field coding mode;
 means for determining a frame coding cost of motion estimation of said at least one block in accordance with a frame coding mode;
 means for comparing said frame vertical pixel difference with said field vertical pixel difference to determine a first coding mode for said at least one block;
 means for comparing said frame coding cost with said field coding cost to determine a second coding mode for said at least one block; and
 means for selecting the coding mode as the first coding mode responsive to the first coding mode being the same as the second coding mode.

16. The apparatus of claim 15, wherein said first coding mode comprises a field coding mode for said at least one block if said frame vertical pixel difference is greater than said field vertical pixel difference.

17. The apparatus of claim 15, wherein said first coding mode comprises a frame coding mode for said at least one block if said frame vertical pixel difference is less than or equal to said field vertical pixel difference.

\* \* \* \* \*